Figure 1:
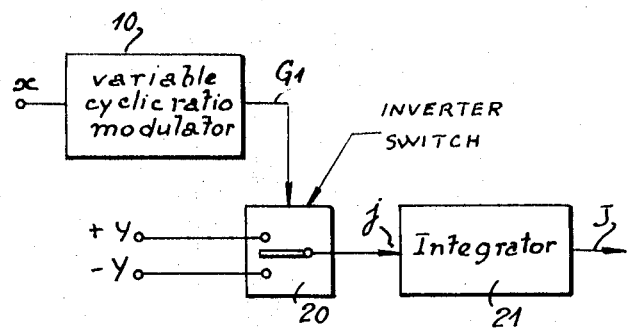

United States Patent
Carnel

[15] 3,648,182
[45] Mar. 7, 1972

[54] DEVICE FOR CONVERTING TWO MAGNITUDES INTO A NUMBER OF PULSES PROPORTIONAL TO THE INTEGRAL OF THEIR PRODUCT

[72] Inventor: Alain Carnel, Paris, France

[73] Assignee: Compagnie des Compteurs, Montrouge, France

[22] Filed: Sept. 28, 1970

[21] Appl. No.: 75,849

[30] Foreign Application Priority Data

Oct. 22, 1969 France..................................6936173

[52] U.S. Cl..............................328/160, 307/229, 307/216, 235/194
[51] Int. Cl. ........................................................G06g 7/16
[58] Field of Search..................................328/160; 235/194

[56] References Cited

UNITED STATES PATENTS

| | | | |
|---|---|---|---|
| 2,872,109 | 2/1959 | Smith | 328/160 |
| 2,773,641 | 12/1956 | Baum | 328/160 |
| 3,226,641 | 12/1965 | Miller | 328/160 |

FOREIGN PATENTS OR APPLICATIONS 548,066   10/1957   Canada...............................328/160

Primary Examiner—Donald D. Forrer
Assistant Examiner—Harold A. Dixon
Attorney—Pierce, Scheffler & Parker

[57] ABSTRACT

The device comprises a variable cycle ratio modulator on which is applied a first input signal, an inverter-switch connected to the modulator output and on which is applied the second input signal, an integrator circuit connected to the inverter-switch, to a two-threshold comparator and to an inversion device, and a device for counting the signals from the comparator.

4 Claims, 6 Drawing Figures

DEVICE FOR CONVERTING TWO MAGNITUDES INTO A NUMBER OF PULSES PROPORTIONAL TO THE INTEGRAL OF THEIR PRODUCT

This invention concerns a device allowing the conversion of two magnitudes in a number of pulses proportional to the integral of their product said magnitudes being either available or previously converted in the form of electric of fluidic signals.

Though it can be used for other purposes, such an entirely static device can be particularly utilized to measure a quantity of electric power consumed in a circuit or passing through a line or a tube and hereinafter it is assumed - without being limitative - that the device as described is utilized to measure an electric power.

If $x$ and $y$ designate the two input magnitudes, that is the voltage and the current in the contemplated application, the problem to solve consists of sending out pulses at successive times $t_1$ and $t_2$ so that:

$$\int_{t_1}^{t_2} xy \cdot dt = Q,$$

designating a constant which, in the present case represents a quantity of electric power. The number of pulses so send out by the device for a determined period, then represents, to less than one $Q$ unit, the quantity of electric power which has been consumed in the utilization circuit or that has passed through the line.

The function to be realized can be broken up into three elementary operations.

elaboration of an electric signal, the magnitude thereof being proportional to the instantaneous or almost instantaneous product, of the input magnitudes $x$ and $y$,
integration of this signal,
sending out of a pulse each time that the resulting integral is increased by the quantity $Q$.

The main difficulty comes from the operation dynamic which is necessary to comply with the working practical conditions, that is the device disposition to operate with a sufficiently relative accuracy, in a wide range of values of input magnitudes. Yet, most of the time only one of these amplitudes, for example the current represented by $y$, varies in large limits. This difficulty complicates the realization of both the multiplier and integrator, and consequently limits the number of solutions practically applicable in the realization of these two circuits.

As to the first above mentioned elementary operation, already have been proposed multipliers based on the relation $(x+y)^4 \chi (x-y)^2 = 4 x y$ in which the square is realized, for example by Joule effect. The preceding condition eliminates this type of multipliers because when $x$ and $y$ have very different values, the two squares are close each other and their difference is known with a poor relative accuracy.

The known multiplier devices, using pulse series with variable frequency in terms of the value of $x$ or $y$ are also badly compatible with a great dynamic: while taking into consideration the passing band desired on $x$ and $y$, the maximal frequencies to utilize become necessarily high and require very elatorated circuits to maintain the conversion accuracy.

Also are known multipliers based on the utilization of special characteristics of semiconductors such as Hall effect generators or field effect transistors of which the resistance is rendered variable proportionally to one of the input magnitudes or to reverse thereof. The accuracy of the multiplication depends then on the intrinsic characteristics of each semiconductor which raises critical manufacturing or supplying problems.

Another type of known multiplier utilizes the double pulse modulation in amplitude and duration, one of the input magnitude being chopped into duration pulses proportional to the other: the mean value of this pulse signal is then proportional to the product of the two magnitudes. The accuracy and the dynamic mainly depend upon the aptitude of the chopping device or of the modulator to follow instantaneously the control signal and to send out with accuracy the chopped magnitude, the multiplication being correct only if input magnitudes vary very little during a chopping period. If these magnitudes $x$ and $y$ are alternating, the chopping frequency must be appreciably higher than the maximal frequency of the $x$ and $y$ variations, but in integrating in a rather long period, the residual error can remain low, even for a moderated chopping frequency.

As to the second above-mentioned elementary operation, that is the integration, the known devices have principally a source of error due to the integrator drift which is caused, on one hand, by the offset voltage and current of the amplifier thereof, and, on the other hand, by the residual voltage and current from the gates of the chopping device. Disadvantages can also result in pulses being sent out though one of the input magnitudes, and consequently the product, remains null for a while.

The invention concerns an integrator-multiplier device of the double modulation type in which means are provided to appreciably decrease the errors due to the integrator drift and avoid the disadvantages above mentioned.

The device, as set forth in the invention, is fitted with a variable cyclic ratio modulator on which is applied the representative signal of the first input magnitude to convert this signal into rectangular signals modulated in duration, at least an inverter-switch on which is applied the representative signal of the second input magnitude connected to the modulator output and, at least an integrator circuit connected to the inverter-switch output, and the device is characterized in that said integrator is followed by a two-threshold comparator of which the output signals are applied on means allowing to cyclically invert the integrator input signal.

The said means allowing to cyclically invert the input integrator signal, can be as follows:
either an auxiliary inverter-switch of the signal representative the first input magnitude, connected above the modulator,
or an auxiliary inverter-switch of the signal representative of the second input magnitude connected above the inverter-switch controlled by the modulator,
or an EXCLUSIVE OR circuit, with two inputs, one input being connected to the modulator output, the other input to the comparator-integrator output, and having the output thereof connected to the inverter-switch control.

Besides, this device is especially designed to be utilized in electronic technics, for a realization in the form of integrated circuits, the number of discrete components being limited to the integration capacitors and to an input resistance allowing a caliper change. However, this device is also well adapted to the fluidic technics and can be utilized for a realization only with elements of fluid type since the components which are utilized are commercially sold both for the realization through electronics and for realization through fluidic means.

The invention will be better understood with reference to the following description, and to the accompanying drawing, given as a not limitative example.

Figure 2:
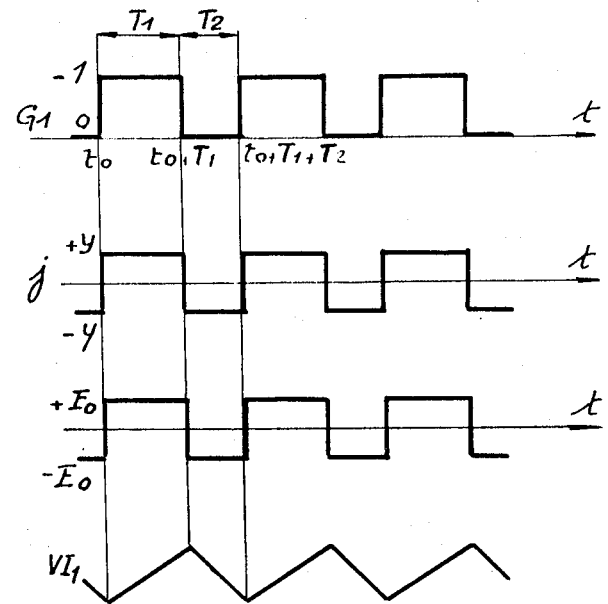
Figure 3:
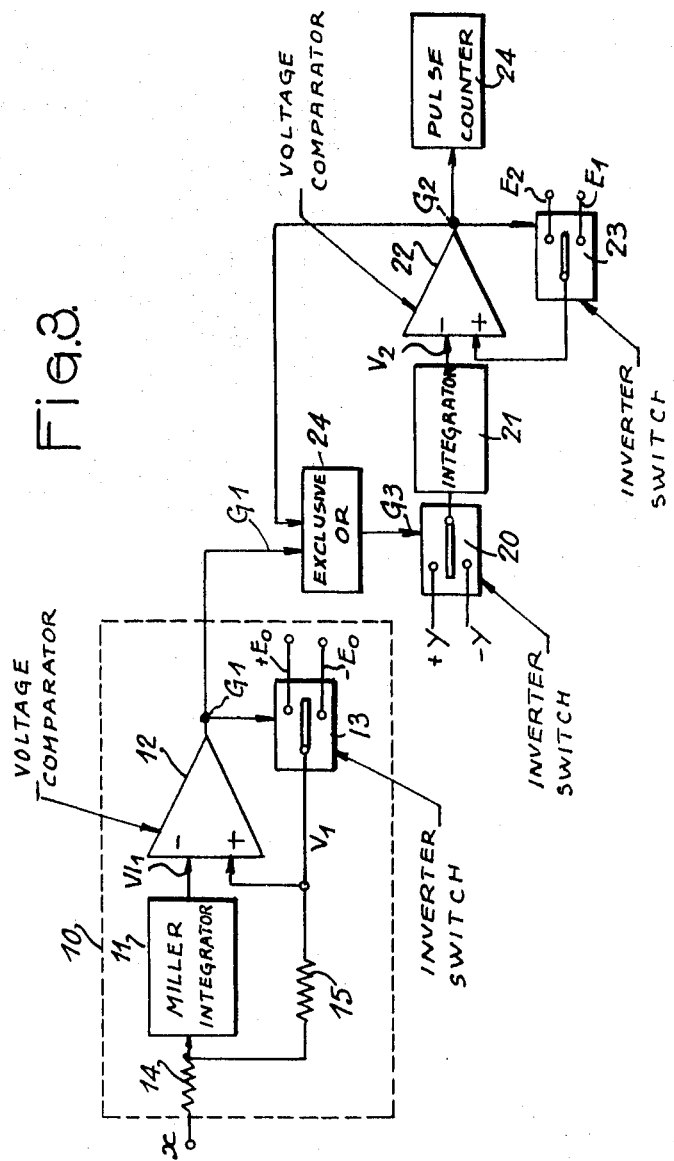
Figure 4:
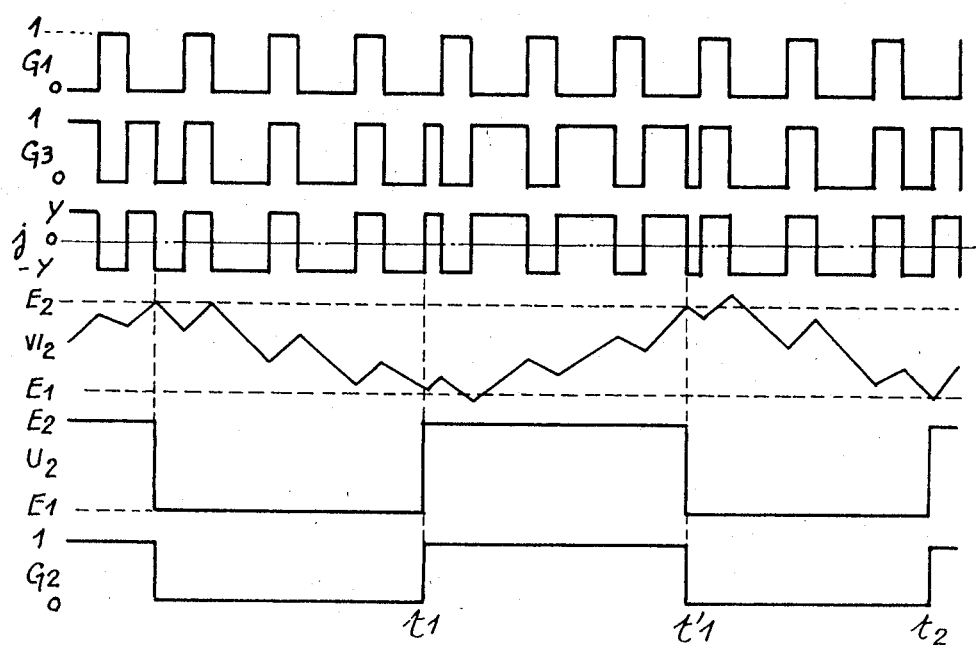
Figure 5:
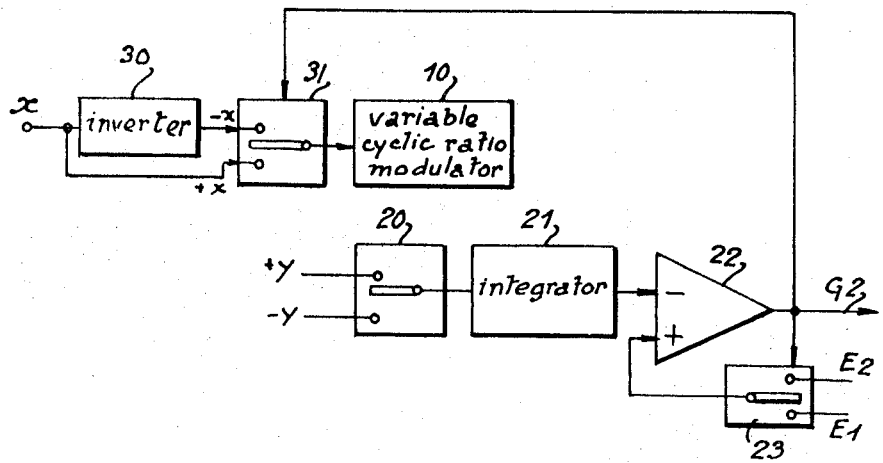
Figure 6:
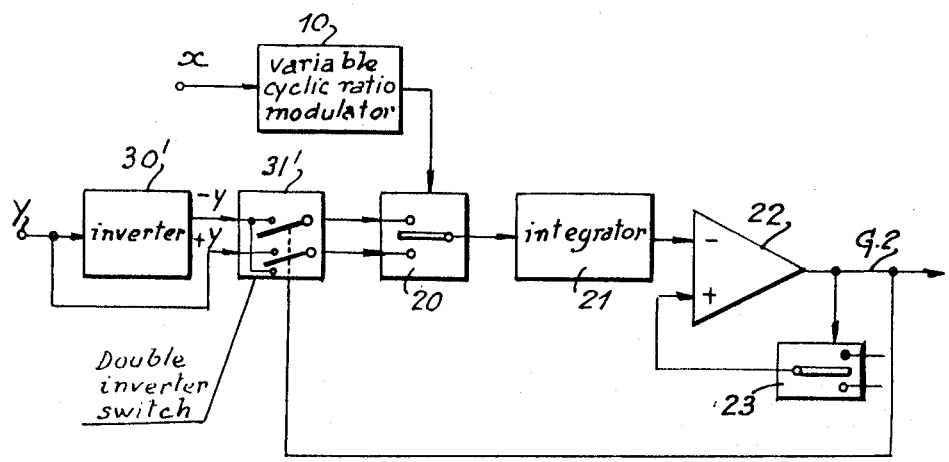

On this drawing:
FIG. 1 is a synoptic diagram of an integrator-multiplier of a known type.
FIG. 2 is a diagram explaining the operation of this known device.
FIG. 3 represents the diagram of a device according to a preferred embodiment of the invention.
FIG. 4 is a diagram concerning the operation of the device of FIG. 3.
FIGS. 5 and 6 represent diagrammatically other embodiments of the invention.

On FIG. 1 is shown a modulator 10 with variable cyclic ratio at the input of which is applied a magnitude $x$ for example in the form of a voltage. This modulator sends out a binary logical signal $G_1$ for a duration $T_1$ at a potential corresponding to "1" and for a duration $T_2$ at a potential corresponding to "0," as shown on the diagram of FIG. 2 where the time $t$ is indicated in abscissa. This signal $G_1$ controls an analog inverter-switch 20 on the inputs which are applied magnitudes $+y$ and $-y$ converted into the form of voltage or current proportional to said magnitudes. Consequently at the output of switch 20 there is sent out a signal $j$ equal to $y$ when $G_1=1$, and equal to $-y$ when $G_1=0$.

An integrator 21 sends out a pulse for each predetermined quantity $Q$ of the product $x \cdot y$.

The integral with respect to time of signal $j$ during a period of modulation $T_1+T_2$ of signal $G_1$ is:

$$\int_{t_0}^{t_0+T_1+T_2} j \cdot dt = \int_{t_0}^{t_0+T_1} y \cdot dt + \int_{t_0+T_1}^{t_0+T_1+T_2} -y \cdot dt = y \cdot (T_1 - T_2)$$

The control signal $G_1$ being periodical, the mean output current $J$ can be written as:

$$J = y \frac{T_1 - T_2}{T_1 + T_2}$$

in which $$R = \frac{T_1 - T_2}{T_1 + T_2}$$

designates the cyclic ratio. The function of the modulator 10 consists of submitting the signal $G_1$ with a cyclic ratio $R=x$, from where $J=Ry=xy$.

The mean output current $J$ is then representative of the product of the two input magnitudes $x$ and $y$.

Such a modulator can be realized in several ways, for example by a device giving a serrated standard voltage used as a comparison element with voltage $x$ and causing the change of state of a flip-flop where there is equality of the two voltages or also by means of an oscillator with saturated magnetic core. It is yet desirable to adopt the provisions which will be described with reference to FIG. 3 and which represents a more detailed diagram of an integrator-modulator device, according to the invention. Modulator 10 is composed of an integrator 11, for example of the capacitance-resistance type or Miller integrator, connected to one of the inputs of a voltage comparator 12 of which the operation is hereunder indicated.

On the second input of the comparator 12 and through an inverter-switch 13, controlled by the comparator output signal $G_1$, is applied a reference voltage $+E_0$ or $-E_0$. This voltage is also applied in a feedback way to the input of integrator 11 through a resistor 15 to form a summation network. The magnitude $x$ is also applied to the input of integrator 11 through a resistor 14.

Comparator 12 is, for example a differential amplifier with a large gain followed by a quick release circuit which gives an output signal $G_1$, of a logical value 0 or 1 determined by the polarity of input voltage deviation.

The output of comparator 12 is also connected through an EXCLUSIVE OR-circuit 24 having two inputs, the utilization thereof will be further indicated to the control of the inverter-switch 20 at the input of which are applied the magnitudes $+y$ and $-y$. This switch 20 is connected to the input of a two-threshold comparator-integrator composed of an integrator 21 followed by a voltage comparator 22, of the same type as comparator 12. The output of comparator 22 is connected on one hand to the control of an analog switch 23 making it possible to apply voltages $E_1$ or $E_2$ on one hand to the second input of comparator 22 and on the other hand to the second input of EXCLUSIVE OR-circuit 24, the logical output signal thereof being designated as $G_3$.

The logical output signal $G_2$ of comparator 22 represents the device output pulse signal. The operation is as follows: as previously shown, the mean output voltage at switch 13 is of the form:

$$E_0 \frac{T_1 - T_2}{T_1 + T_2}.$$

the ratio of times $T_1$ and $T_2$ having to be adjusted so that:

$$\frac{T_1 - T_2}{T_1 + T_2} = \frac{x}{E_0}.$$

For $G_1=0$, the output voltage $V_1$ of switch 13 is $V_1 = -E_0$. The current received through integrator 11 is then:

$$\frac{x}{R_1} - \frac{E_0}{R_2}$$

, in designating by $R_1$ and $R_2$ the respective ohmic magnitudes of resistors 14 and 15. Parameters $E_0$, $R_1$, $R_2$ have been selected, in such a way to always obtain for the concerned caliper:

$$x < \frac{E_0 R_1}{R_2}.$$

In these conditions, the output voltage $VI_1$ of integrator 11 decreases as shown in FIG. 2. At the moment $t_0$, $VI_1$ becomes lower than $-E_0$. Comparator 12 of which input voltage deviation is now negative, gives the signal $G_1=1$. Consequently switch 13 reverses into the state for which $V_1=+E_0$. The current received through the integrator is then:

$$\frac{x}{R_1} + \frac{E_0}{R_2}$$

and the output voltage thereof $VI_1$ increases from $-E_0$ to $+E_0$ (FIG. 2) in a time $T_1$ proportional to $$\frac{2E_0}{\frac{E_0}{R_2} + \frac{x}{R_1}}$$

At the time $t_0+T_1$, the voltage $VI_1$ of integrator becoming higher than $+E_0$, the comparator gives the signal $G_1=0$. The switch 13 reverses again, the current receives by the integrator again is $$\frac{x}{R_1} - \frac{E_0}{R_2}$$

and the voltage $VI_1$ decreases from $+E_0$ to $-E_0$ in a time $T_2$ proportional to $$\frac{2E_0}{\frac{E_0}{R_2} - \frac{x}{R_1}},$$

and so on.

The cyclic ratio $$R = \frac{T_1 - T_2}{T_1 + T_2}$$

is written:

$$\frac{x \cdot R_2}{E_0 \cdot R_1}$$

and is checked as being well proportional to $x$, the proportional coefficient being $$\frac{1}{E_0} \cdot \frac{R_2}{R_1}.$$

Before studying the subsequent phases of the operation, first will be shown how the utilization of comparator-integrator 21 having thresholds $E_1$, $E_2$, in which the integration time is divided by 2, allows to reduce the drift caused by eddy signals. It is assumed that, from time $t_1$ to time $t'$ the integrator receives the current $J=xy$, the output voltage $VI_2$ thereof being increased from $E_1$ to $E_2$ and that at the time $t'_1$ the input current is inverted, the output voltage thereof decreasing from $E_2$ to $E_1$ between the time $t'_1$ and $t_2$. If $e$ designates the eddy current causing the drift, the times are such as $$\int_{t_1}^{t'_1} (J+e) dt = C(E_2 - E_1)$$

$$\int_{t_1'}^{t_2} (-J+e)\,dt = C(E_1 - E_2)$$

C being a constant.
For a constant current J:

$$t_1' - t_1 = C \frac{E_2 - E_1}{J+e}$$

$$t_2 - t_1' = C \frac{E_2 - E_1}{J-e}$$

and then:

$$t_2 - t_1 = 2C \frac{E_2 - E_1}{J} \cdot \frac{1}{1 - \frac{e^2}{J^2}}$$

The relative error is no longer $e/J$ but $e^2/J^2$, much lower than $e/J$, if this term is small in itself with regard to the unit.

Besides, if $J=0$, the integrator is saturated with eddy current $e$ which causes the maximum sending-out of a pulse whatever be the duration while $J$ is null since there is no more inversion of input current.

The periodical inversion of current $J$, which has to be performed above the switch 20 to equalize the eddy signal introduced by it, is advantageously performed according to the preferred embodiment as shown in FIG. 3 by inverting the control signal $G_1$, that is in changing over the chopping times $T_1$ and $T_2$ by EXCLUSIVE OR-circuit 24.

Comparator 22 operating in a way similar to comparator 12, but with the two reference voltages $E_1$ and $E_2$ as integration thresholds, the output signal $G_2$ thereof elaborated on the way $y$ cooperates with signal $G_1$ elaborated on way $x$ as follows:

When $G_2=0$, the control signal $G_3$ of switch 20 has the same magnitudes as $G_1$. When $G_2=1$, the signal $G_3$ has the magnitudes complementary to $G_2$ by realizing the inversion of current $J$ during this half-period. The diagram represented on FIG. 4 shows as function of time, the development of the signals during a period from $t_1$ to $t'_1$ and from $t'_1$ to $t_2$.

When measuring an electrical power, the pulses $G_2$, representative of the integral of product $xy$, can be totalized in a pulse counter 24 which then reads the amount of electrical power consumed during a determined period of time in a circuit where $x$ represents the supply voltage and $y$ the current utilized or a proportional voltage to said magnitudes.

It is to be noticed that voltage $x$ being the common supply voltage, a single modulator 10 can be common to several ways $y_1, y_2 \ldots y_n$ relative to different consumers, that is to give the same signals $G_1$ to these different ways through EXCLUSIVE OR circuits in a corresponding number.

FIGS. 5 and 6, where the same elements have the same reference number as previously, represent two other embodiments in which the cyclic inversion of the input signal of integrator is obtained by means of an inverter-switch connected to the input of one of the magnitudes $x$ or $y$ above the chopping and controlled by signals $G_2$ from the comparator-integrator.

On FIG. 5 the magnitude $x$ is applied to an inverter 30, for example an operational an operational amplifier which gives the amplitude $-x$; the signals $+x$ and $-x$ are then applied to the input terminals of an inverter-switch 31, which is controlled by signals $G_2$ from comparator 22.

On FIG. 6, the magnitude $y$ is applied to an inverter 30' and the magnitudes $+y$ and $-y$ are applied to a double-inverter-switch 31' controlled by signals $G_2$ from comparator 22.

Though on the figures, the switches are represented in the electromechanical form, it is understood that these elements are, preferably, realized by entirely static means, for example semiconductors operating in analog switch, especially bipolar or threshold transistors, of a technology compatible with their installation in the device.

As previously indicated, the invention can also be embodied with elements concerning fluidic technics, in using components of fluid type, the magnitudes being then referenced from a pressure taken as origin to have a measuring range including both positive and negative values.

The invention is not limited to the special application above described as an example but is also applicable for integrating the product of any magnitude available or converted into the form of voltage or electric current or of fluidic signals, such as, for example, the measure of mass, calories, etc., from an information of volume flow and an information of specific weight, of temperature difference, etc.

I claim:

1. Device for converting two input magnitudes converted into signals, in a number of pulses proportional to the integral of their product, comprising a variable cyclic ratio modulator on which is applied the signal representative of the first input magnitude whereby this signal is converted into rectangular signals which as modulated in duration, at least one inverter-switch to which is applied the signal representative of the second input magnitude, said inverter-switch being connected to the modulator output, at least one integrator circuit connected to the inverter-switch output, a two-threshold comparator connected to the output of the integrator and receiving the signals from said integrator, an inversion device connected both to the comparator output and to the integrator input whereby the signals coming from the comparator cause the cyclic inversion of the integrator input signal, and a device for counting the signals coming from the two-threshold comparator, said signals corresponding to the product integral of the signals figurative of the two input magnitudes.

2. Device as set forth in claim 1, wherein the inversion device includes an EXCLUSIVE OR circuit with two inputs and one output one of the inputs therein being connected to the modulator output and the other to the comparator output, while the output of said EXCLUSIVE OR circuit therein is connected to control of the inverter-switch to which is applied the signal representative of the second input magnitude.

3. Device as set forth in claim 1, wherein said inversion device includes an auxiliary inverter-switch of the signal representative of the first input magnitude, said inverter-switch being connected above the modulator.

4. Device as set forth in claim 1, wherein said inversion device includes an auxiliary inventer-switch of the signal representative of the second input magnitude, said inverter-switch being connected above the modulator controlled inverter-switch.

* * * * *